United States Patent [19]

Suzuki

[11] Patent Number: 4,736,587
[45] Date of Patent: Apr. 12, 1988

[54] SHAPE-MEMORY ELECTROMECHANICAL DRIVE

[75] Inventor: Masaru Suzuki, Chiryu, Japan

[73] Assignee: Kabushiki Kaisha Tokai Rika Denki Seisakusho, Aichi, Japan

[21] Appl. No.: 795,902

[22] Filed: Nov. 7, 1985

[30] Foreign Application Priority Data

Nov. 7, 1984 [JP] Japan ............... 59-169337[U]

[51] Int. Cl.⁴ ............................................. F16K 31/02
[52] U.S. Cl. ................................... 60/528; 137/625.46; 137/625.48; 251/11
[58] Field of Search ................... 60/527, 528, 529; 251/11, 231, 59, 236, 243, 236, 235; 337/141; 137/625.65, 625.66, 625.25, 625.46, 625.48

[56] References Cited

U.S. PATENT DOCUMENTS

| | | | |
|---|---|---|---|
| 142,292 | 8/1873 | Stevens | 137/625.25 |
| 954,682 | 4/1910 | Wohl et al. | 60/528 |
| 2,996,049 | 8/1961 | Huska | 92/120 |
| 3,613,732 | 10/1971 | Willson et al. | 60/527 X |

FOREIGN PATENT DOCUMENTS 2148444 5/1985 United Kingdom ............... 60/528

Primary Examiner—Robert G. Nilson
Attorney, Agent, or Firm—Birch, Stewart, Kolasch & Birch

[57] ABSTRACT

A shape-memory electromechanical drive device comprising a casing, a pair of fixed terminal members carried by the casing in electrically insulated relation thereto, an actuating member supported within the casing for movement between two positions from an intermediate position in opposite directions and having a pair of spaced spring seats defined therein, and a pair of coil springs interposed between the fixed terminal members and the spring seats, respectively. Each of the coil springs is made of shape-memory alloy and capable of returning from a compressed state to an original, expanded state when heated to a predetermined temperature. These coil springs are heated by the flow of an electric current therethrough one at a time when the device is in use.

5 Claims, 2 Drawing Sheets

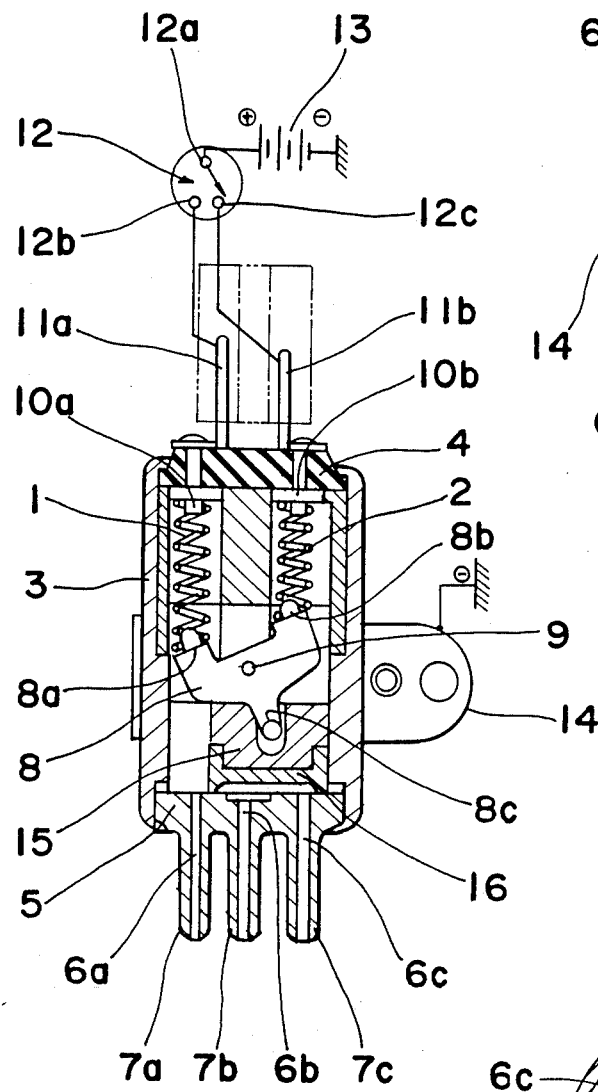

SHAPE-MEMORY ELECTROMECHANICAL DRIVE

BACKGROUND OF THE INVENTION

The present invention generally relates to the utilization of a shape-memory alloy and, more particularly, to an electromechanical drive device utilizing spring elements, each made of shape-memory alloy, for driving an actuator for a valve or gears.

Hitherto, where a drive is desired to be produced by the utilization of electricity, an electric drive motor or an electromagnetic device having a solenoid and a plunger have been used. These devices are generally heavy in weight, high in cost, and high in operating speed and are also susceptible to the generation of impact noise.

SUMMARY OF THE INVENTION

The present invention has been developed with a view to substantially eliminating the above described problems inherent in the prior art drive device and has for its essential object to provide an improved electromechanical drive device wherein a shape-memory alloy is utilized to provide a drive by heating the shape-memory alloy by the application of an external electric energy to change the shape thereof.

Another important object of the present invention is to provide an improved electromechanical drive device of the type referred to above, which is light-weight and compact in size, can be manufactured at low costs, can operate noiselessly, and can operate at a slow speed.

In order to accomplish these objects, the improved electromechanical drive device according to the present invention comprises a pivotally supported actuating member having a pair of spring seats defined therein in opposition to each other, an insulator carrying at least one pair of spaced electrodes fixed thereto, and a pair of coil springs each made of shape-memory alloy and capable of taking a definite free length, memorized thereby, when heated, but being compressed from the free length at normal temperature. These coil springs are disposed between the spring seats and the fixed electrodes, respectively, while in the compressed state. The drive device also comprises a pusher element operable in response to the pivotal movement of the actuating member for effecting a switch of a value or gears.

With this construction according to the present invention, when one of the coil springs is heated by the application of an electric current therethrough to permit it to expand to the definite free length, the other of the coil springs have no electric current flowing therethrough is compressed causing the actuating member to pivot about the axis of pivot. In this way, the pusher element can be moved in response to the pivotal movement of the actuating member for effecting the switching of the valve or gears.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following description taken in conjunction with preferred embodiments thereof with reference to the accompanying drawings, in which:

FIG. 1 is a longitudinal sectional view of a shape-memory electromechanical drive device according to a preferred embodiment of the present invention;

FIG. 2 is a bottom plan view of the device shown in FIG. 1;

FIG. 4 is a cross-sectional end view of the drive device taken along line IV—IV of FIG. 3;

DETAILED DESCRIPTION OF THE EMBODIMENTS

Figure 3:
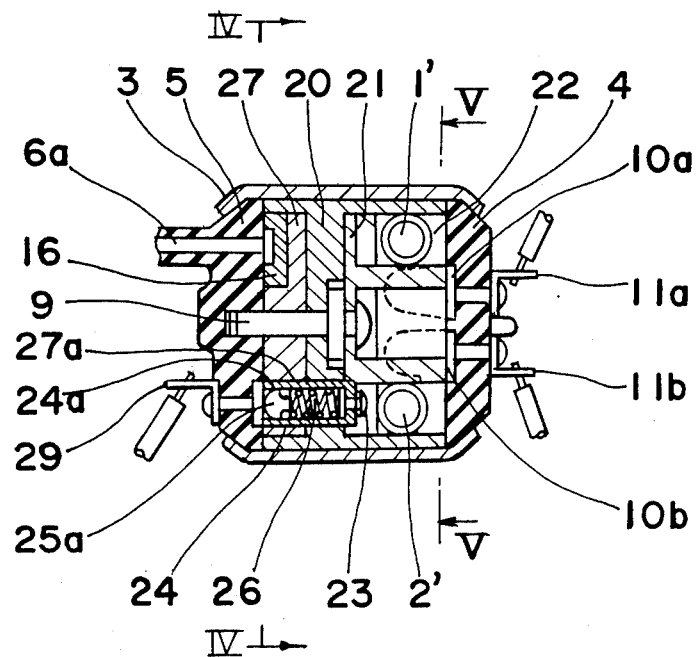
FIG. 3 is a longitudinal sectional view of the drive device according to another preferred embodiment of the present invention.

Before the description of the preferred embodiments of the present invention proceeds, it is to be noted that like parts are designated by like reference numerals throughout the accompanying drawings.

Referring first to FIGS. 1 and 2, a shape-memory electromechanical drive device shown therein is designed for providing a drive necessary to switch a vent valve by the utilization of alternate linear expansion and contraction of two coil springs 1 and 2 each made of a shape-memory alloy. For this purpose, the drive device comprises a generally cylindrical casing 3 made of alloy and having its opposite open ends closed by an insulator 4 and a base member 5. The base member 5 has three vent holes 6a, 6b and 6c defined therein so as to extend completely through the thickness thereof and also has elbows 7a, 7b and 7c formed integrally therewith so as to protrude outwardly of the casing 3 in alignment with, and in communication with, the respective vent holes 6a, 6b and 6c. On the other end, the insulator 4 carries electrodes 10a and 10b fixed thereto in spaced relationship with respect to each other so as to extend completely through the thickness of the insulator 4, outer ends of said respective electrodes 10a and 10b being connected through terminal member 11a and 11b to an electric switch 12. The electric switch 12 shown therein is of a type having a movable contact 12a, connected with a source of electric power 13, for example, a battery unit, and a pair of spaced fixed contacts 12b and 12c connected respectively with the terminal members 11a and 11b.

The drive device also comprises an actuating member (or rotor) 8 of a generally Y-shaped configuration made of electroconductive material, and a switching valve member 16 slidable on the base member 5 between first and second positions in a direction perpendicular to the longitudinal sense of the casing 3 and operatively coupled through a slider 15 with the actuating member (or rotor) 8 in a manner as will now be described. It is to be noted that one of the opposite surfaces of the valve member 16 which is held in sliding contact with the base member 5 within the casing 13 is so grooved inwardly that when the valve member is in the first position as shown in FIG. 1, the vent hole 6b is communicated with the vent hole 6c, but when it is moved to the second position, the vent hole 6b can be communicated with the vent hole 6a.

The actuating member (or rotor) 8 has a pair of outwardly diverging arms, each having its free end formed into a respective spring seat 8a or 8b, and a leg extending from the joint between the arms in a direction away from the arms. This actuating member (or rotor) 8 is pivotally connected to the casing 3 by means of a pivot pin 9 having its opposite ends journalled to the casing 3 and a substantially intermediate portion passing through the actuating member 8 at a location generally corresponding to the joint of the arms and leg. With the actuating member (or rotor) 8 so supported within the casing 3, the free end of the leg thereof has a pusher element 8c mounted thereon and drivingly engaged in a socket defined in the slider 15 so that the valve member 16 movable together with the slider 15 can be linearly moved in response to the rocking motion of the actuating member (or rotor) 8 about the pivot pin 9.

Each of the coil springs 1 and 2 made of shape-memory alloy as hereinbefore described is of a type capable of expanding to a predetermined free length memorized therein when it is heated to a predetermined temperature or higher, the respective coil spring, however, assuming a compressed state when it is at a normal temperature. These coil springs 1 and 2 are accommodated within the casing 3 and are disposed, while in the compressed state, between an inner end of the electrode 10a and the spring seat 8a in the actuating member (or rotor) 8 and between an inner end of the electrode 10b and the spring seat 8b in the actuating member.

The drive device according to the embodiment of FIGS. 1 and 2 operates in the following manner.

When in use, the casing 3 is electrically grounded through a mounting bracket 14 used for the installation of the drive device. Then, assuming that the switch 12 is operated to connect the movable contact 12a to the fixed contact 12b, a first electric circuit including the electrode 10a, the coil spring 1, the actuating member (or rotor) 8, the pivot pin 9, the casing 3 and the bracket 14 can be completed, and therefore, an electric current from the power source 13 flows towards the ground through the above described first electric circuit, heating the coil spring 1. When the coil spring 1 so heated attains the predetermined temperature, the coil spring 1 expands to the memorized free length, producing a pushing force on the spring seat 8a in the actuating member (or rotor) 8. By the action of this pushing force, the actuating member (or rotor) 8 is pivoted counterclockwise, as viewed in FIG. 1, about the pivot pin 9, while further compressing the coil spring 2, and therefore, the slider 15 operatively coupled with the actuating member (or rotor) 8 through the pusher piece 8c is moved rightwards, also as viewed in FIG. 1, accompanied by a corresponding rightward slide of the valve member 16 from the second position towards the first position as shown in FIG. 1 with the vent hole 6b consequently communicated with the vent hole 6c.

On the other hand, when the movable contact 12a is engaged with the fixed contact 12c as shown, an electric current from the power source 13 flows towards the ground through a second electric circuit including the electrode 10b, the coil spring 2, the actuating member (or rotor) 8, the pivot pin 9, the casing 3 and the bracket 14, with the coil spring 2 consequently heated. The heating of the coil spring 2 to the predetermined temperature results in the thermal expansion of the coil spring 2 which in turn brings about the counterclockwise pivot of the actuating member (or rotor) 8 and, therefore, the valve member 16 in the illustrated first position can be moved to the second position in a manner substantially reverse to that described hereinbefore. In this position, the vent hole 6b is communicated with with the vent hole 6a.

In the embodiment of the present invention which will now be described with reference to FIGS. 3 to 6, a rotor is employed in place of the generally Y-shaped actuating member used in the foregoing embodiment, and at the same time, a safety device is provided in the electric circuitry. Also, in the embodiment of FIGS. 3 to 6, the coil springs 1' and 2' identical in structure and material with the coil springs 1 and 2 employed in the foregoing embodiment are arranged in a generally arcuate configuration so as to occupy respective portions of the circle concentrical with the axis of rotation of the rotor.

Referring now to FIGS. 3 to 6, the casing 3 having its opposite ends closed by the insulator 4 and the base member 5 as is the case with the foregoing embodiment has its interior divided into two chambers by a spacer 20. The rotor identified by 21 is housed within the right-hand chamber, as viewed in FIG. 3, and is rotatably fitted to the spacer 20 by means of the pivot pin 9. The rotor 21 is provided with a spring housing portion 22 formed by arcuately cutting the outer periphery thereof through a predetermined angle, for example, 270° and has a generally sector-shaped projection 21a stepped so as to protrude radially outwardly therefrom, said sector-shaped projection 21a having its opposite sides fixedly provided with respective spring seats 21b and 21c.

Figure 5:
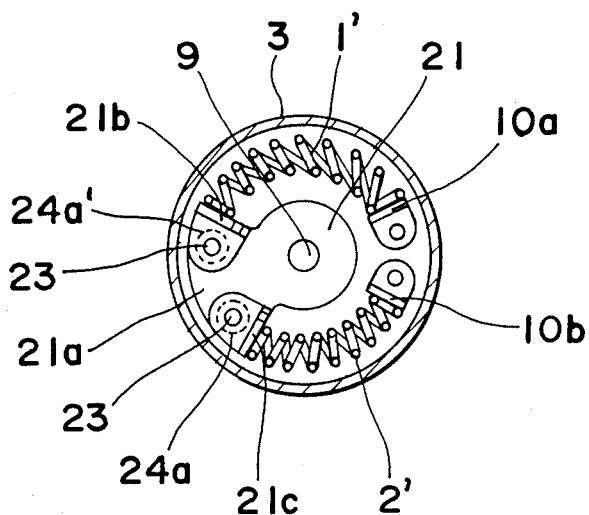
FIG. 5 is a cross-sectional view taken along the line V—V in FIG. 3.

The insulator 4 has the terminal members 11a and 11b fixed thereto, which terminal members 11a and 11b are connected with the switch 12 on the one hand and with the associated fixed electrodes 10a and 10b on the other hand. The fixed electrodes 10a and 10b carried by the insulator 4 protrude into the spring housing portion 22 within the right-hand chamber of the casing 3, and the coil springs 1' and 2' are disposed between the electrode 10a and the spring seat 21b and between the electrode 10b and the spring seat 21c, respectively, while extending arcuately therebetween about the pivot pin 9 as best shown in FIG. 5.

At a position offset from the pivot pin 9, the rotor 21 is formed with a pair of spaced contact holders 24, having holes 24a and 24a', respectively defined therein, so as to protrude into the left-hand chamber adjacent the base member 5, which contact holders 24 constitute a pusher piece. Each of the holes 24a and 24a' is arcuate in shape and because the spacer 20 is longitudinally fixed relative to the casing 3, movement of contact holders 24 relative to spacer 20 is permitted. Each of the contact holders 24 has a respective movable contact member 25a or 25b accommodated within the associated hole 24a or 24a' and resiliently urged towards the base member 5 by the action of a respective spring 26. The movable contact members 25a and 25b so arranged in the contact holders 24 are electrically connected with the spring seats 21b and 21c through electrodes 23 and springs 26, respectively.

The pivot pin 9 connecting the rotor 21 rotatably to the spacer 20 extends through the spacer 20 into the left-hand chamber and is journalled to the base member 5. A rotary member 27 is housed within the left-hand chamber and is mounted for rotation about the pivot pin 9. The rotary motion of the rotor 21 is therefore transmitted to the rotary member 27 through the contact holders 24. The valve member 16 slidable along the base member 5 is fitted to a portion of the rotary member 27 which acts as a pusher element and is offset from the pivot pin 9 for movement together therewith. The rotary member 27 has engagement holes 27a defined therein in alignment with, and for the passage therethrough of, the respective contact holders 24.

Figure 6:
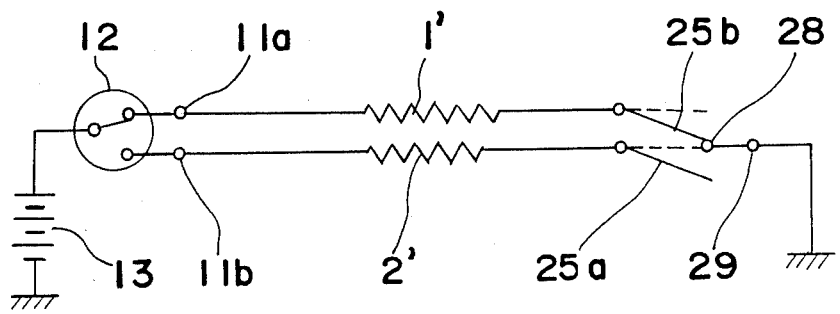
FIG. 6 is a diagram showing an electric circuit of the drive device shown in FIG. 3.

As best shown in FIG. 4, the valve member 16 rotatable together with the rotary member 27 in the embodiment of FIGS. 3 to 6, is adapted to undergo an angular movement in sliding contact with the base member 5 through a predetermined angle $\theta$ about the pivot pin by the effect of the thermal deformation of the coil springs 1' and 2' as will be described later, so that the vent hole 6b can be selectively communicated with one of the vent holes 6a and 6c in a manner similar to that described in connection with the foregoing embodiment. The base member 5 also has a fixed contact 28 secured thereto for selective engagement with one of the movable contact members 25a and 25b depending on the direction of rotation of the rotor 21 in such a way that, when the coil spring 2' expands with the rotor 21 consequently rotated clockwise as viewed in FIG. 5, the fixed contact 28 can be disengaged from the movable contact member 25b, but when the coil spring 1' expands with the rotor 21 consequently rotated counterclockwise, the fixed contact 28 can be disengaged from the movable contact member 25a. The fixed contact 28 is adapted to be grounded through a terminal member 29 as shown in FIG. 6. The switch comprised of the movable contact members 25a and 25b and the fixed contact 28 constitutes a safety device operable to avoid any possible overheating of the coil spring, when such coil spring being heated expands in full stroke, by disconnecting the circuit as shown by the phantom lines in FIG. 6 upon the movement of the movable contact members 25a and 25b.

The operation of the drive device according to the embodiment shown in and described with reference to FIGS. 3 to 6 will now be described.

Assuming that the switch 12 is operated to effect the supply of an electric current from the power source 13 to the coil spring 1', the latter is heated and, hence, expands arcuately, causing the rotor 21 to rotate counterclockwise, as viewed in FIG. 5, while compressing the coil spring 2'. By this rotation of the rotor 21, the valve member 16 is moved through the rotary member 27 to communicate the vent hole 6a with the vent hole 6b. When the rotor 21 is moved in full stroke subsequent to the thermal expansion of the coil spring 1', the movable contact member 25b rotatable together with the rotor 21 is disengaged from the fixed contact 28 thereby opening the circuit to interrupt the flow of the electric current through the coil spring 1'. On the other hand, if the switch 12 is reversed to connect the coil spring 2' to the electric power source 13, the rotor 21 is rotated clockwise, in a manner reverse to the counterclockwise rotation of the rotor 21 as a result of the thermal expansion of the coil spring and, hence, the valve member is moved to communicate the vent hole 6b with the vent hole 6a.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A shape-memory electromechanical drive device for a valve or gear arrangement comprising:
   an actuating member comprising a rotor and pusher element, said rotor being rotatably supported by a pivot pin and having a pair of spring seats, said pusher element being fixed to said rotor and being operable in response to rotation of said rotor, said pusher element providing a drive force for switching said valve or gear arrangement;
   at least one pair of electrodes; and
   a pair of coil springs each being made of shape-memory alloy, each spring having a predetermined free length when heated and a second length when at normal temperature, said second length being less than said predetermined free length, a first one of said coil springs being disposed between one of said spring seats and a first one of said electrodes, a second one of said coil springs being disposed between another of said spring seats and a second one of said electrodes, said first electrode having an electrical current supplied thereto in a first mode, said current heating said first coil spring and causing said first coil spring to thermally expand, said second coil spring being unheated in said first mode and being compressed as said first coil spring expands, said rotor being rotated in one direction as said first coil spring thermally expands and said second coil spring compresses.

2. The shape-memory electromechanical drive device as recited in claim 1, wherein said coil springs partially encircle said pivot pin.

3. The shape-memory electromechanical drive device as recited in claim 1, further comprising first and second terminal members fixedly connected to said respective first and second electrodes, a metallic casing electrically connected to the pivot pin, and an external current source inserted between said terminal members and the casing to form an electric circuit.

4. The shape-memory electromechanical drive device as recited in claim 1, further comprising a switch for supplying current to said first electrode during said first mode, said switch supplying current to said second electrode during a second mode, said second coil spring being heated in said second mode by said current supplied to said second electrode and thermally expanding in response thereto, said first coil spring being unheated in the second mode and being compressed as said second coil spring expands, said rotor being rotated in a direction opposite to said one direction as said second coil spring thermally expands and said first coil spring compresses.

5. The shape-memory electromechanical drive device as recited in claim 4 and further comprising:
   a pair of movable contact members being electrically connected to said coil springs and being movable with the rotor;
   a stationary base member having a fixed contact member, said fixed contact member being engageable with a first one of said pair of movable contact members as said rotor moves in one direction during the first mode and with a second one of said pair of movable contact members as said rotor moves in the opposite direction during the second mode;

first, second and third terminal members fixedly connected with the fixed contact member, the first electrode and the second electrode, respectively; and an external current source inserted between the first terminal member and the second and third terminal members to form an electric circuit, said electric circuit opening when one of the first and second coil springs expands to their predetermined free length.

* * * * *